Figure 1:
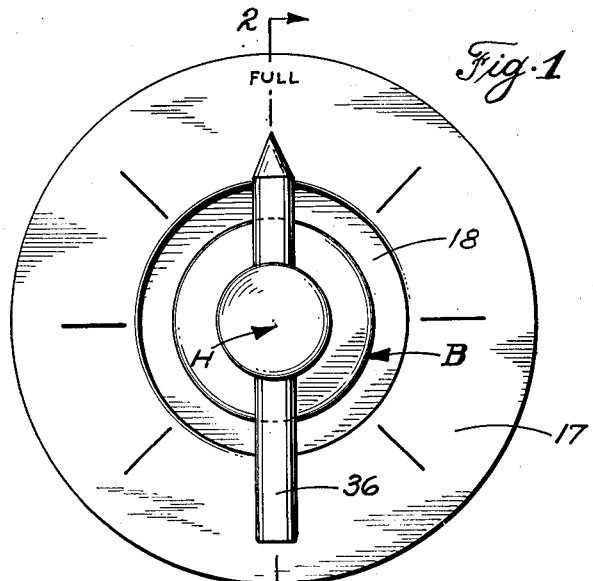

Nov. 25, 1952     T. A. ST CLAIR     2,618,975

ROTARY LIQUID LEVEL GAUGE

Filed Sept. 6, 1951

INVENTOR.
THEODORE A. ST. CLAIR.

BY Rickey & Watts

ATTORNEYS

Patented Nov. 25, 1952

2,618,975

UNITED STATES PATENT OFFICE 2,618,975

ROTARY LIQUID LEVEL GAUGE

Theodore A. St. Clair, Cleveland, Ohio, assignor to The Weatherhead Company, Cleveland, Ohio, a corporation of Ohio Application September 6, 1951, Serial No. 245,285

6 Claims. (Cl. 73—298)

This invention relates to liquid level gauges and more particularly to liquid level gauges of the rotary type. Such gauges commonly employ a rotatable bent tube which is turned until the end of the tube reaches the liquid level in the tank, whereupon the gauge permits fluid from the tank to escape. The position of the handle by which the tube is rotated thereby gives an indication of the liquid level in the tank.

These gauges are commonly employed, for example, in liquefied petroleum gas installations and are usually maintained in the tank or storage vessel below the liquid level occurring when the tank is full. Due to such mounting, it has been necessary to provide a packing about the valve stem that permits rotation thereof without leakage of the vessels contained.

The principal object of the invention is to improve the dependability of such a gauge by eliminating the need for the stem packing. Other objects are to simplify and render more economical the construction of the gauge and to avoid the possibility of the escaping test fluid striking the operator's body.

The manner in which these and other objects are accomplished will be apparent in the following detailed description of the preferred embodiment of the invention.

Figure 4:
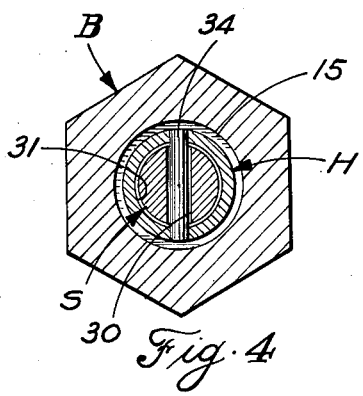
Figure 2:
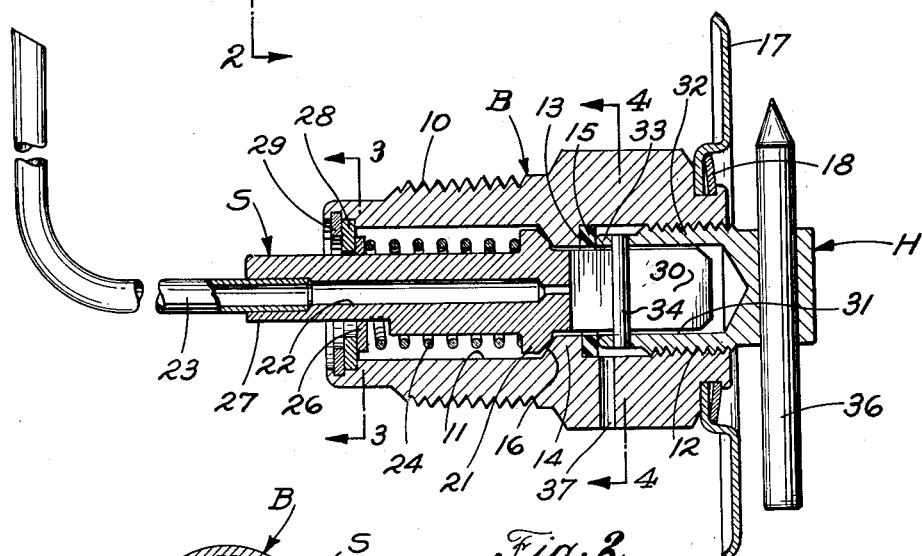
Figure 3:
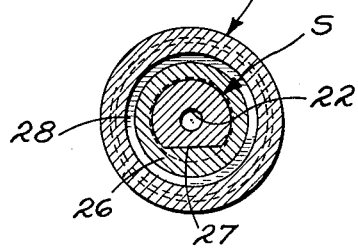

In the drawings:

Fig. 1 is a front view of the gauge;
Fig. 2 is a section taken on 2—2 of Fig. 1;
Fig. 3 is a section taken on 3—3 of Fig. 2;
Fig. 4 is a section taken on 4—4 of Fig. 2.

The complete gauge comprises three major elements: a body B, an operating handle or valve member in the form of a screw H, and a stem S.

Body B is threaded as at 10 for mounting on the tank or vessel, the axis of the body being normally horizontal in the completed installation. The body has a through bore 11, the axially outer end of which is threaded as at 12 to receive the screw handle H. Intermediate the bore, a shoulder 13 is provided which serves to back up a sealing washer 15 forming an axially outer valve seat, and a conical shoulder 16 is formed in the body bore forming an axially inner valve seat. Mounted on the body is a flange 17 which may be calibrated with reference to the position of the handle to indicate the liquid level, such flange being retained by a snap ring 18 in a suitable groove in the body.

The stem S has an enlargement or flange 21 for sealing engagement with the conical shoulder 16 on the body. The stem has a passageway 22 formed therein as part of the indicating system.

Extending from the inner end of the stem is a bent liquid level sensing tube 23 communicating with stem passage 22. A spring 24 surrounds the stem and engages flange 21 at one end and engages a special washer 26 at the other end. Washer 26 has a non-circular hole therein so that it turns with the stem which (as best seen in Fig. 3) is flattened as at 27. This construction precludes winding up of the spring as the stem is rotated in the body. The spring is backed up by a conventional washer 28 retained by a snap ring 29 in the body.

The stem has an extension that is slotted as at 30 to provide for a driving connection. The handle H is counterbored as at 31 to receive the stem extension. The handle is screw threaded as at 32 to fit the body threads 12. The axially inner end of the handle has a sealing surface 33 in the form of a rounded annular nose for engaging the seat gasket 15. A cross pin 34 is mounted on the handle and extends through the slot 30 thereby coupling the handle and stem together for rotation while permitting relative axial or sliding motion of these parts.

A combined grip member and indicator in the form of a pin 36 is mounted on the handle and cooperates with plate 17 to reveal the position of the bent tube 23. In order to give an indication of when the bent tube is at the liquid level, a port 37 is provided in the body axially outwardly of washer 15.

In operation, with the valve mounted in a tank containing liquid such as liquefied petroleum gas, the handle is turned until seat 33 makes sealing engagement with gasket 15. This positively prevents any liquid or gas that might leak past the stem and conical seat 16 from escaping either through port 37 or past the threads 12, and represents the "full" position of the handle.

To test the liquid level, the handle is backed off a full turn and the parts are so positioned that the indicator 36 again points to "full" on the dial and the tube 23 has its end extending vertically. The interior of the tank is now opened to atmosphere by means of tube 23, stem passageway 22, and body port 37. Thus, although some gas may escape, liquid will not escape even if the gauge is below the liquid level, because of the sealing action of flange 21 on the stem and body shoulder 16. Even though this provides a metal-to-metal sealing contact, it is adequate because the inside of the tank is now open to atmosphere.

To find the liquid level, the handle is now slowly rotated in the opening direction and the exit of the port 37 is observed. When the end of the tube 23 is reached, the liquid can escape through the port 37, or such liquid may enter the valve and evaporate at the exit 37 thereby condensing moisture at the exit and thereby indicating that the end of the bent tube is at the liquid level.

Having determined the liquid level motion, the handle H is reversed until the seal with gasket seal 15 is effected. Thus, it can be seen that a positively-sealed and leak-proof construction is provided without need of expensive and troublesome packing about either the stem or the handle. This construction is more dependable in operation and more economical in construction than the packed-stem type of device. Furthermore, the construction of the stem and of the sliding and driving connection between the stem and the handle lends itself to economic and rapid production. Only a relatively few number of parts are required but despite the simplicity of the device, it is perfectly leak-proof in normal service. The exit port 37 extends to one side instead of out the handle, thereby preventing fluid contact with the operator.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A liquid level gauge comprising a valve body having a bore therethrough, an operating valve member threaded in the outer end of said bore, sealing means on said member and body engageable to close off said bore, an apertured stem rotatable in said bore, sealing means between said stem and body axially inwardly of said first-named sealing means to close off said bore, there being a passage in said stem connected to said bore axially outwardly of said second-named sealing means but being closed off by said first-named sealing means with said valve member closed, there being a port in said body connected to said bore axially outwardly of said first-named sealing means, a sliding, driving connection between said member and stem, and a bent tube extending from said stem passageway.

2. A liquid level gauge comprising a valve body having a bore therethrough, an operating valve member threaded in the outer end of said bore, sealing means on said member and body engageable to close off said bore, an apertured stem rotatable in said bore, sealing means between said stem and body axially inwardly of said first-named sealing means, spring means between said stem and body urging said stem so as to close off said bore, there being a passage in said stem connected to said bore axially outwardly of said second-named sealing means but being closed off by said first-named sealing means with said valve member closed, there being a port in said body connected to said bore axially outwardly of said first-named sealing means, a sliding, driving connection between said member and stem, and a bent tube extending from said stem passageway.

3. A liquid level gauge comprising a valve body adapted for connection to a vessel, there being a bore through said body, axially opposed inner and outer valve seats in said body intermediate said bore, an operating screw threaded in the axially outer end of said bore, a sealing surface formed on said screw for engaging the axially outer valve seat, a stem rotatable in said body bore and having a sealing surface engaging the axially inner valve seat, there being a bore in said stem, a bent tube forming a continuation of said bore, there being a port in said body communicating with said stem bore axially outwardly of said outer valve seat, and a sliding drive connection between said screw and said stem.

4. A liquid level gauge comprising a valve body adapted for connection to a vessel, there being a bore through said body, axially opposed inner and outer valve seats in said body intermediate said bore, an operating screw threaded in the axially outer end of said bore, a sealing surface formed on said screw for engaging the axially outer valve seat, a stem rotatable in said body bore and having a sealing surface, spring means between said body and stem holding said stem sealing surface against the axially inner valve seat, there being a bore in said stem, a bent tube forming a continuation of said bore, there being a port in said body communicating with said stem bore axially outwardly of said outer valve seat, and a sliding drive connection between said screw and said stem.

5. A liquid level gauge comprising a valve body adapted for connection to a vessel, there being a bore through said body, axially opposed inner and outer valve seats in said body intermediate said bore, an operating screw threaded in the axially outer end of said bore, said screw having a counterbore, a sealing surface formed on said screw for engaging the axially outer valve seat, a stem rotatable in said body bore and having a sealing surface engaging said axially inner valve seat, there being a bore in said stem, a bent tube forming a continuation of said bore, there being a port in said body communicating with said stem bore axially outwardly of said outer valve seat, a slotted extension on said stem disposed within said screw counterbore, and drive means on said screw extended into the slot in said stem extension.

6. A liquid level gauge comprising a valve body adapted for connection to a vessel, there being a bore through said body, axially opposed inner and outer valve seats in said body intermediate said bore, an operating screw threaded in the axially outer end of said bore, said screw having a counterbore, a sealing surface formed on said screw for engaging the axially outer valve seat, a stem rotatable in said body bore and having a sealing surface, spring means between said body and stem holding said stem sealing surface against the axially inner valve seat, there being a bore in said stem, a bent tube forming a continuation of said bore, there being a port in said body communicating with said stem bore axially outwardly of said outer valve seat, a slotted extension on said stem disposed within said screw counterbore, and drive means on said screw extended into the slot in said stem extension.

THEODORE A. ST. CLAIR.

REFERENCES CITED

The following references are of record in the file of this patent:

UNITED STATES PATENTS

| Number | Name | Date |
|---|---|---|
| 2,267,221 | Roney | Dec. 23, 1941 |
| 2,546,832 | Norway | Mar. 27, 1951 |